US009646607B2

(12) United States Patent
Nix et al.

(10) Patent No.: US 9,646,607 B2
(45) Date of Patent: May 9, 2017

(54) MANAGING WAKE-ON-VOICE BUFFER QUALITY BASED ON SYSTEM BOOT PROFILING

(71) Applicant: Dell Products, L.P., Round Rock, TX (US)

(72) Inventors: William D. T. Nix, Austin, TX (US); Rocco Ancona, Austin, TX (US); Richard William Schuckle, Austin, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 68 days.

(21) Appl. No.: 14/202,190

(22) Filed: Mar. 10, 2014

(65) Prior Publication Data

US 2015/0255070 A1 Sep. 10, 2015

(51) Int. Cl.
G10L 17/22 (2013.01)
G10L 15/08 (2006.01)
G10L 15/22 (2006.01)
G10L 15/28 (2013.01)

(52) U.S. Cl.
CPC ............. *G10L 15/08* (2013.01); *G10L 15/22* (2013.01); *G10L 15/28* (2013.01); *G10L 2015/088* (2013.01); *G10L 2015/223* (2013.01)

(58) Field of Classification Search
CPC .... G10L 17/22; G10L 15/08; G10L 2015/088
USPC ........................................................ 704/275
See application file for complete search history.

(56) References Cited

U.S. PATENT DOCUMENTS

| 6,408,396 | B1* | 6/2002 | Forbes | G06F 3/165 |
| | | | | 713/323 |
| 6,889,191 | B2* | 5/2005 | Rodriguez | G06F 17/2735 |
| | | | | 704/228 |
| 8,346,313 | B2* | 1/2013 | Tu | H04W 52/0216 |
| | | | | 455/127.5 |
| 2006/0229877 | A1* | 10/2006 | Tian | G10L 13/06 |
| | | | | 704/267 |
| 2006/0265223 | A1* | 11/2006 | Doyle | G10L 15/20 |
| | | | | 704/240 |
| 2007/0016419 | A1* | 1/2007 | Lee | G10L 15/26 |
| | | | | 704/250 |
| 2008/0019263 | A1* | 1/2008 | Stolpman | H04L 1/0041 |
| | | | | 370/210 |
| 2008/0221882 | A1* | 9/2008 | Bundock | G10L 15/26 |
| | | | | 704/235 |

(Continued)

*Primary Examiner* — Tammy Paige Goddard
*Assistant Examiner* — Edwin S Leland, III
(74) *Attorney, Agent, or Firm* — Fogarty LLP

(57) ABSTRACT

Systems and methods for managing wake-on-voice buffer quality based on system boot profiling. In an illustrative, non-limiting embodiment, an Information Handling System (IHS) may include at least one logic circuit and at least one memory circuit coupled to the at least one logic circuit, the at least one memory including program instructions stored thereon that, upon execution by the at least one logic circuit, cause the IHS to: determine an expected time duration of a future wake event; receive a verbal command from a user, the verbal command configured to trigger the future wake event; capture the verbal command as an audio signal; adjust at least one of: a quality of the audio signal or a duration of the audio signal, where the adjustment is based, at least in part, upon the expected time duration; and store the adjusted audio signal in a fixed-size buffer.

18 Claims, 3 Drawing Sheets

(56) References Cited

U.S. PATENT DOCUMENTS

| | | | |
|---|---|---|---|
| 2009/0003254 A1* | 1/2009 | Hattig | G06F 1/3203 370/311 |
| 2009/0109297 A1* | 4/2009 | Nakagawa | G11B 27/10 348/222.1 |
| 2009/0299752 A1* | 12/2009 | Rodriguez | D06F 58/28 704/275 |
| 2010/0204987 A1* | 8/2010 | Miyauchi | G10L 15/25 704/233 |
| 2012/0020266 A1* | 1/2012 | Sun | H04W 52/0216 370/311 |
| 2012/0078397 A1* | 3/2012 | Lee | G10L 25/78 700/94 |
| 2013/0325484 A1* | 12/2013 | Chakladar | G10L 15/26 704/275 |
| 2014/0207467 A1* | 7/2014 | White | G10L 15/24 704/275 |
| 2015/0189328 A1* | 7/2015 | Edlis | H04L 65/601 375/240.28 |
| 2015/0255070 A1* | 9/2015 | Schuckle | G10L 15/08 704/275 |
| 2015/0331941 A1* | 11/2015 | Defouw | G10L 25/51 707/687 |

* cited by examiner

MANAGING WAKE-ON-VOICE BUFFER QUALITY BASED ON SYSTEM BOOT PROFILING

FIELD

This disclosure relates generally to computer systems, and more specifically, to systems and methods for managing wake-on-voice buffer quality based on system boot profiling.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Certain IHSs may have "wake-on-voice" capabilities. Generally speaking, wake-on-voice is a feature that allows an IHS to be turned on or awakened (e.g., from "sleep" or "standby") in response to having received a voice or audio command from a user.

SUMMARY

Embodiments of systems and methods for managing wake-on-voice buffer quality based on system boot profiling are described herein. In an illustrative, non-limiting embodiment, an Information Handling System (IHS) may include at least one logic circuit and at least one memory circuit coupled to the at least one logic circuit, the at least one memory including program instructions stored thereon that, upon execution by the at least one logic circuit, cause the IHS to determine an expected time duration of a future wake event; receive a verbal command from a user, the verbal command configured to trigger the future wake event; capture the verbal command as an audio signal; adjust at least one of: a quality of the audio signal or a duration of the audio signal, where the adjustment is based, at least in part, upon the expected time duration; and store the adjusted audio signal in a fixed-size buffer.

For example, the logic circuit may include a Digital Signal Processor (DSP) or the like. The future wake event may include a transition from a present power state to a subsequent power state, where the subsequent power state consumes more power than the present power state. The verbal command may include a keyword. The verbal command may include an instruction following the keyword, the instruction configured to be executed by the IHS during the subsequent power state.

To determine the expected time duration of the future wake event, the program instructions may cause the IHS to create a profile of historical wake times between two or more different wake states. In some cases, a wake time between two given wake states may change over time. Moreover, to adjust the quality of the audio signal or the duration of the audio signal, the program instructions may cause the IHS to change at least one of: a codec of the audio signal, a compression of the audio signal, a sample rate of the audio signal, a bit depth of the audio signal, or a number of channels of the audio signal.

In another illustrative, non-limiting embodiment, a method may include receiving an audio signal configured to trigger a wake event of an IHS; and adjusting a quality of the audio signal or a duration of the audio signal, based, at least in part, upon an expected time duration of the wake event, where the audio signal is stored in a memory having a fixed size. The wake event may include a transition from a present power state to a subsequent power state, and where the subsequent power state consumes more power than the present power state.

The audio signal may include an instruction following the keyword, the instruction configured to be executed by the IHS during the subsequent power state. The method may further include creating a profile of historical wake times between two or more different wake states. The expected time duration of the wake event may change over time across different instances of the wake event. Adjusting the quality of the audio signal may further include changing a codec of the audio signal, a compression of the audio signal, a sample rate of the audio signal, a bit depth of the audio signal, or a number of channels of the audio signal.

In yet another illustrative, non-limiting embodiment, a non-transitory computer-readable medium may have program instructions stored thereon that, upon execution by an IHS, cause the IHS to receive an audio signal configured to trigger a wake event of the IHS; and adjust a quality of the audio signal or a duration of the audio signal, based, at least in part, upon an expected time duration of the wake event, where the audio signal is stored in a memory having a fixed size.

The wake event may include a transition from a present power state to a subsequent power state, where the subsequent power state consumes more power than the present power state. The audio signal may include an instruction following the keyword, the instruction configured to be executed by the IHS during the subsequent power state. The program instructions, upon execution by the IHS, may further cause the IHS to create a profile of historical wake times between two or more different wake states. The expected time duration of the wake event may change over time across different instances of the wake event. The program instructions, upon execution by the IHS, may further cause the IHS to change a codec of the audio signal, a compression of the audio signal, a sample rate of the audio signal, a bit depth of the audio signal, or a number of channels of the audio signal.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
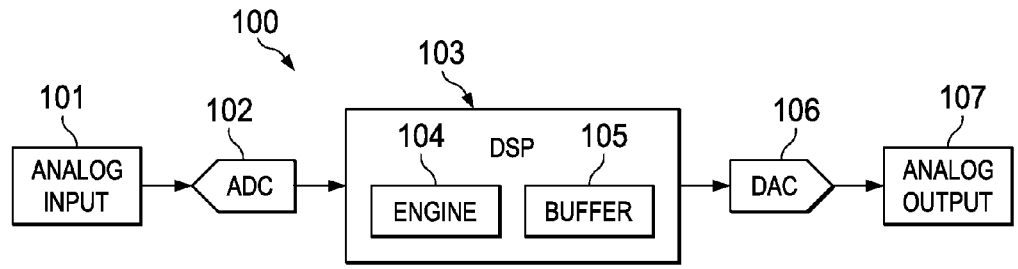
FIG. 1 is a diagram illustrating an example of an environment where systems and methods for managing wakeon-voice buffer quality based on system boot profiling may be implemented according to some embodiments.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail in FIG. 3.

The overall power consumption of an IHS can be categorized into "power states." For example, the Advanced Configuration and Power Interface (ACPI) specification provides a standard for device configuration and power management that defines a total of six different power states ranging from "S0," when the IHS is completely powered on and fully operational to "S5," when the IHS is completely powered off. Intermediate states "S1," "S2," "S3," and "S4" are referred to as wake/sleep/standby states. During these states, an IHS may appear to a human user to be off, but may retain enough of its hardware context (e.g., registers, memory caches, RAM, etc.) to return to the working state without rebooting.

Particularly, in the S1 state, the IHS consumes less power than in the S0 state; yet all hardware and processor context is maintained. In the S2 state, the IHS consumes less power than S1 state. The IHS' CPU loses power and processor context, and contents of its cache may be lost. In the S3 state, the IHS consumes less power than in the S2 state. The CPU's context, cache contents, and chipset's context may be lost; but the system memory is retained. In the S4 state, also known as "hibernation," the IHS consumes the least power compared to all other sleep states. The IHS is almost at an off state, expect for a trickle power. Context data is written to a hard drive, and there is no context retained. Note that in power state S4, an IHS can restart from context data stored on a hard disk, but in S5 the IHS requires a reboot.

With respect to transitions between states, it is noted that an IHS is "waking up" when transitioning from the off state S5 or any state S1-S4 to state S0. Conversely, the IHS is said to be going to "sleep" when transitioning from the on state S0 to the off state S5 or any state S1-S4. Typically, an IHS may not enter one sleep state directly from another; rather it enters the on state S0 before entering any other sleep state. It should be noted, however, that the foregoing power states are discussed for purposes of illustration only, and that different IHSs may have different wake/sleep/standby states.

In some cases, when an IHS is in a sleep or standby state, it may be awoken with a voice or audio command or trigger from a human user. For example, while the IHS is asleep, the user may utter the words "Hello computer, what is the weather forecast for tomorrow?" The IHS may be continuously capturing audio with reduced processing power, even when in its sleep or standby modes, and upon identifying the words "Hello computer," it may trigger a transition from the sleep state to a higher state, which may then allow the remainder of the voice command ("what is the forecast for tomorrow") to be executed by an application running on the IHS. To do that, the IHS may be configured to store the entire audio command in a hardware memory or buffer, for example, in a Digital Signal Processor (DSP) or the like. In some implementations, the "wake time" or "boot time," also referred to herein as a "wake event," may be defined as starting at the time a voice trigger word is detected by the DSP and ending when the IHS' Operating System has fully woken and a Voice Assistant service is operational and ready for speech recognition processing.

Generally speaking, the DSP's buffer or memory has a fixed size. If the captured voice command results in a digital signal that is too long for the size of the buffer, the command may be incompletely captured (e.g., "Hello computer, what's the" or "Hello computer, what's the weather") may not be ultimately and/or properly understood by the application or Voice Assistant service. Unfortunately, it is impractical to specify a fixed buffer size within the DSP chip that meets the requirements of every system, because of variations in boot/wake time due to different software loads, system configurations and sleep states, etc. Even for the same given IHS, boot/wake times can vary over time as new software/hardware is added and/or existing software/hardware is modified or removed.

To address these, and other concerns, embodiments described herein may implement a method configured to predict the time duration of the next wake/boot event. Such a prediction may be based, for example, upon historical wake/boot times or events of the specific target system from its various applicable sleep states. Then the method may include adjust the duration of audio that is stored in the fixed-size buffer (e.g., in the hardware's DSP) by varying the quality of the audio being stored in that buffer.

As such, these methods may deterministically adjust the quality of the audio being stored in the fixed audio buffer or other memory based on a profile which combines knowledge of the sleep state the system is in as well as timing the wake events of the specific system. In some cases, the quality parameters for the audio buffer may be calculated based on, for example, the known fixed-size of the HW DSP audio buffer and historical estimated wake times for the target sleep states (plus a predetermined amount of overhead allowance).

Quality parameters that may be adjusted to affect the size of the audio being stored may include: the type of codec or compression algorithm (PCM, WAV, MP3, FLAC, etc.), sample rate (11 Hz, 22 Hz, 44 Hz, etc.), bit depth (8, 16, 24, etc.), number of channels (stereo vs. mono). These parameters may be weighted for a particular IHS/DSP/buffer installation based on the tradeoffs between quality and size of that particular parameter. As an example, a system may default to capturing and/or storing audio using 44 kHz at 8 bits mono for waking from connected standby; but it may default to capturing and/or storing audio using 11 kHz at 8 bits mono for waking from S3.

Here it should be noted that prior attempts to address these issues have focused on the idea of varying the physical size of the hardware buffer (e.g., in Kilobytes) to affect the amount of latency and the quality of the experience. As such, the conventional approach is contrary to certain embodiments described herein, where audio quality is adjusted in order to fit a variable duration of audio into a fixed amount of storage based on profiling the typical time required between the wake and ready events.

To further illustrate the foregoing, FIG. 1 is a diagram illustrating an example of environment 100 where systems and methods for managing wake-on-voice buffer quality based on system boot profiling may be implemented according to some embodiments. As shown, analog input 101 may include a microphone, a signal conditioning circuit (e.g., a filter), and/or an amplifier. Analog-to-digital converter (ADC) is coupled to analog input 101, and it includes a signal configured to quantize or sample an analog signal captured via analog input 101 into a digital signal. The digital signal is then provided to DSP 103.

In some cases, DSP 103 may be coupled to digital-to-analog converter, which in turn may include a circuit configured to transform a digital signal received from DSP 101 into an analog signal, and may provide the analog signal to analog output 107. Analog output 107 may include a loudspeaker or the like.

DSP 103 includes engine 104 and buffer 105. Engine 104 may include a programmable processor other or the like configured to perform any suitable operation, transformation, or processing upon a digital audio signal. As the digital signal is received at DSP 103, it is stored in hardware buffer 105, which may have a fixed size. In some cases, buffer 105 may be a circular buffer such that, when the buffer is full, a new bit value is stored over the oldest bit value, thus erasing the latter.

In some implementations, DSP 103 may be coupled to or otherwise integrated into an IHS' CPU. As such, DSP 103 may be configured to recognize words uttered by a user as part of a verbal command.

Although illustrated in FIG. 1 as distinct blocks, it should be noted that, in some embodiments, one or more of blocks 102-106 may be combined. Alternatively, blocks 102-106 may be part or other elements within an IHS. For example, buffer 105 may be part of a processor's cache or system memory.

Figure 2A:
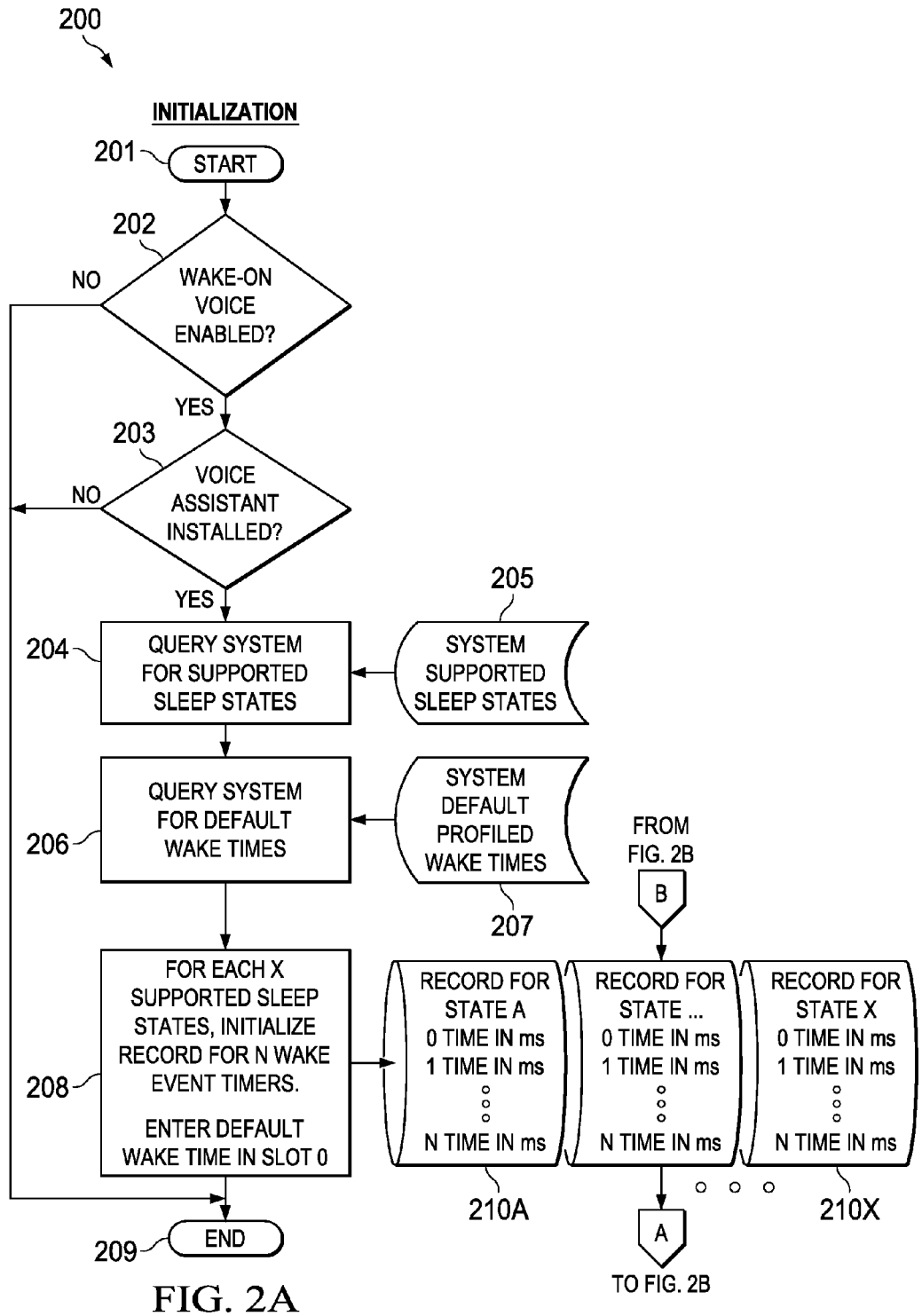
FIGS. 2A-B show a flowchart of an example of a method for managing wake-on-voice buffer quality based on system boot profiling according to some embodiments.
Figure 2B:
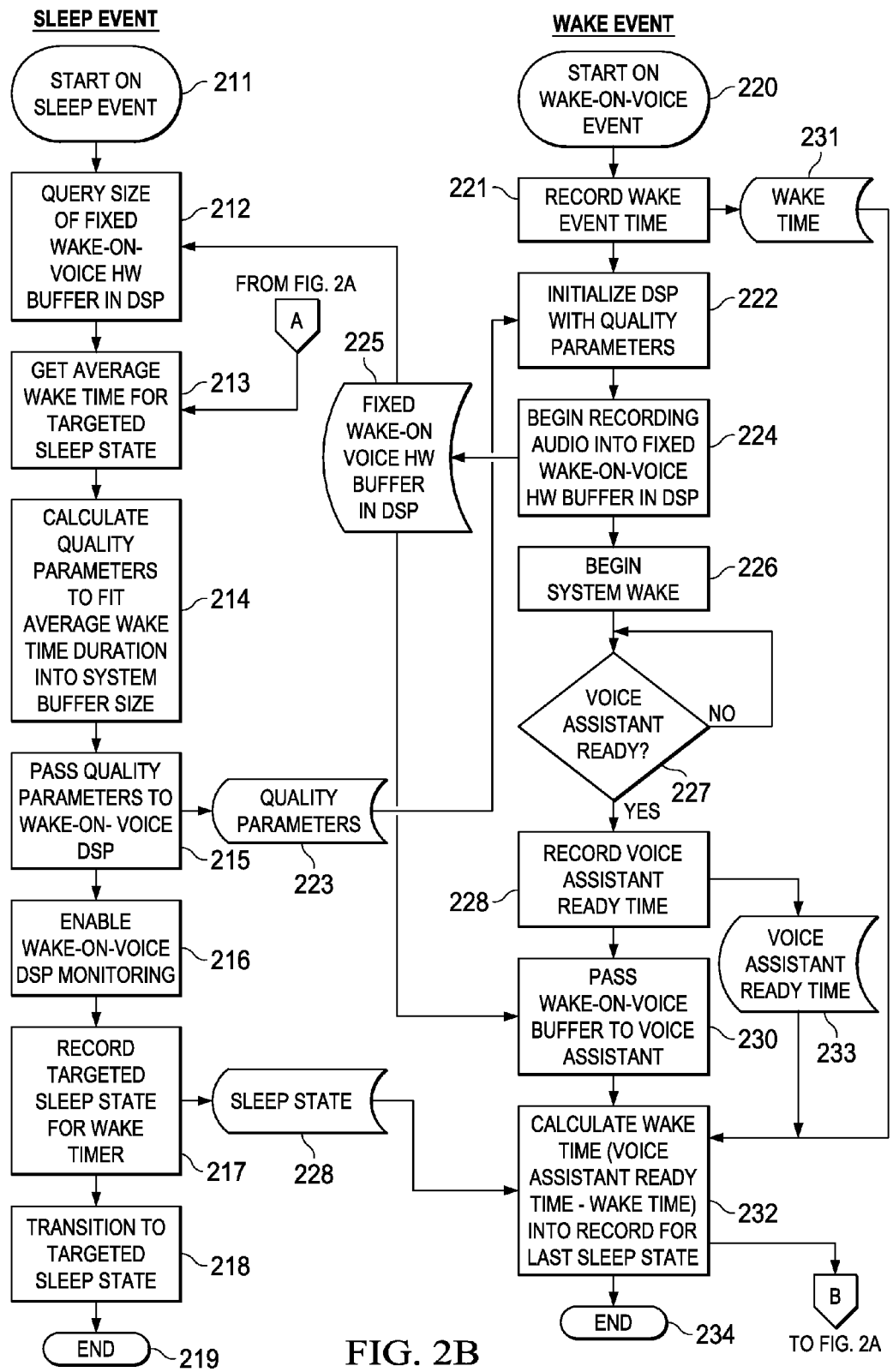

FIGS. 2A-B show a flowchart of an example of a method for managing wake-on-voice buffer quality based on system boot profiling. In some embodiments, method 200 may be performed, at least in part, by DSP 103 of FIG. 1 and/or IHS 300 of FIG. 3. As shown, method 200 is divided into three processes; namely "initialization," "sleep event," and "wake event." With respect to the initialization process, method 200 starts at block 201. At block 202, method 200 determines whether the wake-on-voice feature is enabled. If not, method 200 ends at block 209. Otherwise, at block 203, method 200 determines whether a Voice Assistant service is enabled. If not, method 200 ends at block 209. Otherwise, control passes to block 204.

Block 204 queries the system for supported sleep states, which are received from block 205. Block 206 queries the system for default profiled wake times, which in turn are provided by block 207. Then, at block 207, for each supported sleep state, a record is initiated for N wake event timers. Those records are then shown in blocks 210A-X (for X number of states). Every time the system is initialized, each relevant one of records 210A-X may be updated, depending upon the sleep state transition involved. As such, the initialization portion of method 200 may be configured to create and maintain profile(s) which combine empirical knowledge of the sleep state the system is in (A-X) with the corresponding timing or duration of wake events for the system.

The sleep event process of method 200 begins at block 211. At block 212, method 200 queries the size of the fixed wake-on-voice hardware buffer in the DSP (or other memory). At block 213, method 200 gets the average wake time for targeted sleep state. At block 214, method 200 calculates quality parameters to fit the average wake time duration into the buffer size. At block 215, method 200 passes the calculated quality parameters 223 to the DSP. At block 216, method 200 enables wake-on-voice monitoring. At block 217, method 200 records targeted sleep state for the wake timer 228. At block 218, method 200 transitions to the targeted sleep state. As such, the sleep event process method 200 ends at block 219.

The wake event process of method 200 begins at bock 220. Particularly, at block 221, method 200 records a wake event time 231. At block 222, method 200 initializes the DSP with quality parameters 223 received from block 215. At block 224, method 200 begins recording audio into the fixed size buffer (e.g., in the DSP) 225. At block 226, the system wake process begins. Block 227 determines whether the Voice Assistant service is ready. If not, control returns to block 227. Otherwise, at block 229, method 200 records the Voice Assistant service's ready time 233.

At block 230, method receives the contents of the buffer 225 and passes the audio signal to the Voice Assistant service. Block 232 receives the recorded sleep state timer 228, wake time 231, and/or Voice Assistant ready time 233, calculates the present wake time (e.g., Voice Assistant ready time minus wake time), and stores the result in the corresponding one of records 210A-X for the last sleep state. Then, the wake event process of method 200 ends at block 234.

Figure 3:
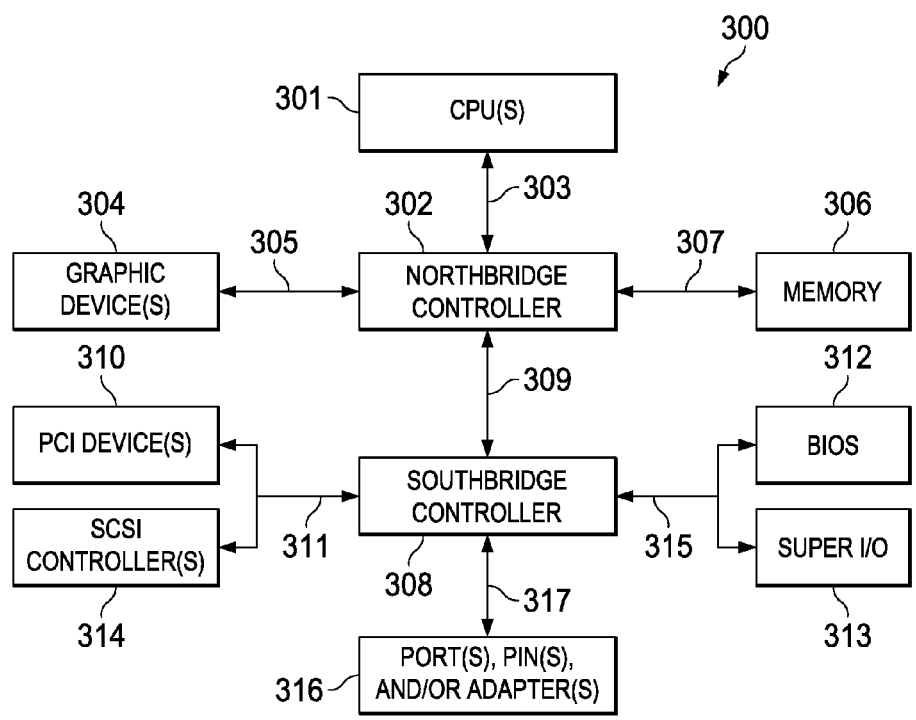
FIG. 3 is a block diagram of an example of an Information Handling System (IHS) according to some embodiments.

FIG. 3 is a block diagram of an example of an IHS. In some embodiments, IHS 300 may be used to implement any computer system, computing device, or the like. As shown, IHS 300 includes one or more CPUs 301. In various embodiments, IHS 300 may be a single-processor system including one CPU 301, or a multi-processor system including two or more CPUs 301 (e.g., two, four, eight, or any other suitable number). CPU(s) 301 may include any processor capable of executing program instructions. For example, in various embodiments, CPU(s) 301 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 301 may commonly, but not necessarily, implement the same ISA.

CPU(s) 301 are coupled to northbridge controller or chipset 301 via front-side bus 303. Northbridge controller 302 may be configured to coordinate I/O traffic between CPU(s) 301 and other components. For example, in this particular implementation, northbridge controller 302 is coupled to graphics device(s) 304 (e.g., one or more video cards or adaptors) via graphics bus 305 (e.g., an Accelerated Graphics Port or AGP bus, a Peripheral Component Interconnect or PCI bus, or the like). Northbridge controller 302 is also coupled to system memory 306 via memory bus 307. Memory 306 may be configured to store program instructions and/or data accessible by CPU(s) 301. In various embodiments, memory 306 may be implemented using any suitable memory technology, such as static RAM (SRAM), synchronous dynamic RAM (SDRAM), nonvolatile/Flash-type memory, or any other type of memory.

Northbridge controller 302 is coupled to southbridge controller or chipset 308 via internal bus 309. Generally speaking, southbridge controller 308 may be configured to handle various of IHS 300's I/O operations, and it may provide interfaces such as, for instance, Universal Serial Bus (USB), audio, serial, parallel, Ethernet, or the like via port(s), pin(s), and/or adapter(s) 316 over bus 317. For example, southbridge controller 308 may be configured to allow data to be exchanged between IHS 300 and other devices, such as other IHSs attached to a network (e.g., network 104). In various embodiments, southbridge controller 308 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 308 may also enable connection to one or more keyboards, keypads, touch screens, scanning devices, voice or optical recognition devices, or any other devices suitable for entering or retrieving data. Multiple I/O devices may be present in IHS 300. In some embodiments, I/O devices may be separate from IHS 300 and may interact with IHS 300 through a wired or wireless connection. As shown, southbridge controller 308 is further coupled to one or more PCI devices 310 (e.g., modems, network cards, sound cards, or video cards) and to one or more SCSI controllers 314 via parallel bus 311. Southbridge controller 308 is also coupled to Basic I/O System (BIOS) 312 and to Super I/O Controller 313 via Low Pin Count (LPC) bus 315.

Furthermore, in some embodiments, southbridge controller 308 may include a DSP such as DSP 103 shown in FIG. 1. Additionally or alternatively, southbridge controller 308 may implement ADC 102 and/or DAC 106, and CPU(s) 301 may implement DSP 103.

BIOS 312 includes non-volatile memory having program instructions stored thereon. Those instructions may be usable CPU(s) 301 to initialize and test other hardware components and/or to load an Operating System (OS) onto IHS 300. Super I/O Controller 313 combines interfaces for a variety of lower bandwidth or low data rate devices. Those devices may include, for example, floppy disks, parallel ports, keyboard and mouse, temperature sensor and fan speed monitoring/control, among others.

In some cases, IHS 300 may be configured to provide access to different types of computer-accessible media separate from memory 306. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 300 via northbridge controller 302 and/or southbridge controller 308.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 300 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 302 may be combined with southbridge controller 308, and/or be at least partially incorporated into CPU(s) 301. In other implementations, one or more of the devices or components shown in FIG. 3 may be absent, or one or more other components may be added. Accordingly, systems and methods described herein may be implemented or executed with other IHS configurations.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   at least one logic circuit; and
   at least one memory circuit coupled to the at least one logic circuit, the at least one memory circuit including program instructions stored thereon that, upon execution by the at least one logic circuit, cause the IHS to:
   (a) while in a wake state:
      identify a target sleep state to be entered into by the IHS when the IHS leaves the wake state;
      estimate a time duration of a transition from the target sleep state back to the wake state, wherein the transition starts at a time an audio signal is detected and ends at a later time when an Operating System (OS) is ready for speech recognition processing; and
      set a quality parameter of the audio signal to be detected based upon the estimated time duration of the transition; and
   (b) enter the target sleep state;
   (c) trigger the transition in response to detecting the audio signal; and
   (d) store the audio signal in a fixed-size buffer.

2. The IHS of claim 1, wherein the at least one logic circuit includes a Digital Signal Processor (DSP).

3. The IHS of claim 1, wherein the wake state consumes more power than the target sleep state.

4. The IHS of claim 1, wherein the audio signal includes a keyword.

5. The IHS of claim 4, wherein the audio signal includes an instruction following the keyword, the instruction configured to be executed by the IHS during the wake state.

6. The IHS of claim 1, wherein to estimate the time duration of the transition from the target sleep state back to the wake state, the program instructions, upon execution by the at least one logic circuit, further cause the IHS to create a profile of historical wake times between the target sleep state and the wake state for different instances of the transition.

7. The IHS of claim 6, wherein the time duration of the transition from the target sleep state back to the wake state changes over time, and wherein estimating the time duration includes estimating the change.

8. The IHS of claim 1, wherein to set the quality parameter of the audio signal to be captured, the program instructions, upon execution by the at least one logic circuit, further cause the IHS to set at least one of: a codec of the audio signal to be captured, a compression of the audio signal to be captured, a sample rate of the audio signal to be captured, a bit depth of the audio signal to be captured, or a number of channels of the audio signal to be captured.

9. In an Information Handling System (IHS), a method comprising:
   while the IHS is in a wake state, identifying, at least in part by a processor within the IHS, a target sleep state to be entered into when the IHS leaves the wake state;
   estimating, at least in part by the processor, a time duration of a transition from the target sleep state back to the wake state, wherein the transition starts at a time an audio signal is detected and ends at a later time when an Operating System (OS) is ready for speech recognition processing, and wherein the time duration of the transition changes across different instances of the transition; and
   prior to entering the target sleep state, setting, at least in part by the processor, a quality parameter of the audio signal to be detected based at least in part upon the estimated time duration of the transition.

10. The method of claim 9, wherein the wake state consumes more power than the target sleep state.

11. The method of claim 9, wherein the audio signal includes an instruction following the keyword, the instruction configured to be executed by the IHS during the wake state.

12. The method of claim 9, further comprising creating a profile of historical wake times between the target sleep state and the wake state for different instances of the transition.

13. The method of claim 9, wherein setting the quality of the audio signal further comprises setting a codec of the audio signal, a compression of the audio signal, a sample rate of the audio signal, a bit depth of the audio signal, or a number of channels of the audio signal.

14. A memory storage device having program instructions stored thereon that, upon execution by an Information Handling System (IHS), cause the IHS to:
   while the IHS is in a wake state, identify a target sleep state to be entered into when the IHS leaves the wake state;
   estimate a time duration of a transition from the target sleep state back to the wake state, wherein the transition starts at a time an audio signal is detected and ends at a later time when an Operating System (OS) is ready for speech recognition processing, and wherein the time duration of the transition changes across different instances of the transition; and
   prior to entering the target sleep state, set a quality parameter of the audio signal to be detected based at least in part upon the estimated time duration of the transition.

15. The memory storage device of claim 14, wherein the wake state consumes more power than the target sleep state.

16. The memory storage device of claim 14, wherein the audio signal includes an instruction following keyword, the instruction configured to be executed by the IHS during the wake state.

17. The memory storage device of claim 14, wherein the program instructions, upon execution by the IHS, further cause the IHS to create a profile of historical wake times between the target sleep state and the wake state for different instances of the transition.

18. The memory storage device of claim 14, wherein the program instructions, upon execution by the IHS, further cause the IHS to change a codec of the audio signal, a compression of the audio signal, a sample rate of the audio signal, a bit depth of the audio signal, or a number of channels of the audio signal.

* * * * *